(12) United States Patent
Xu et al.

(10) Patent No.: US 9,195,462 B2
(45) Date of Patent: Nov. 24, 2015

(54) TECHNIQUES FOR TRACING PROCESSES IN A MULTI-THREADED PROCESSOR

(75) Inventors: Zheng Xu, Austin, TX (US); Suraj Bhaskaran, Austin, TX (US); Jason T. Nearing, Austin, TX (US); Paul B. Rawlins, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 2348 days.

(21) Appl. No.: 11/733,978

(22) Filed: Apr. 11, 2007

(65) Prior Publication Data

US 2008/0256339 A1 Oct. 16, 2008

(51) Int. Cl.
*G06F 9/38* (2006.01)

(52) U.S. Cl.
CPC ............ *G06F 9/3808* (2013.01); *G06F 9/3851* (2013.01)

(58) Field of Classification Search
CPC ............................ G06F 9/3851; G06F 9/3808
USPC ..................................... 712/227; 714/45, 37
See application file for complete search history.

(56) References Cited

U.S. PATENT DOCUMENTS

| 6,145,122 A | 11/2000 | Miller et al. |
| 6,253,338 B1* | 6/2001 | Smolders ........................ 714/45 |
| 2004/0019891 A1* | 1/2004 | Koenen ......................... 718/102 |

* cited by examiner

*Primary Examiner* — Alford W. Kindred
*Assistant Examiner* — Benjamin Geib

(57) ABSTRACT

A technique for tracing processes executing in a multi-threaded processor includes forming a trace message that includes a virtual core identification (VCID) that identifies an associated thread. The trace message, including the VCID, is then transmitted to a debug tool.

7 Claims, 7 Drawing Sheets

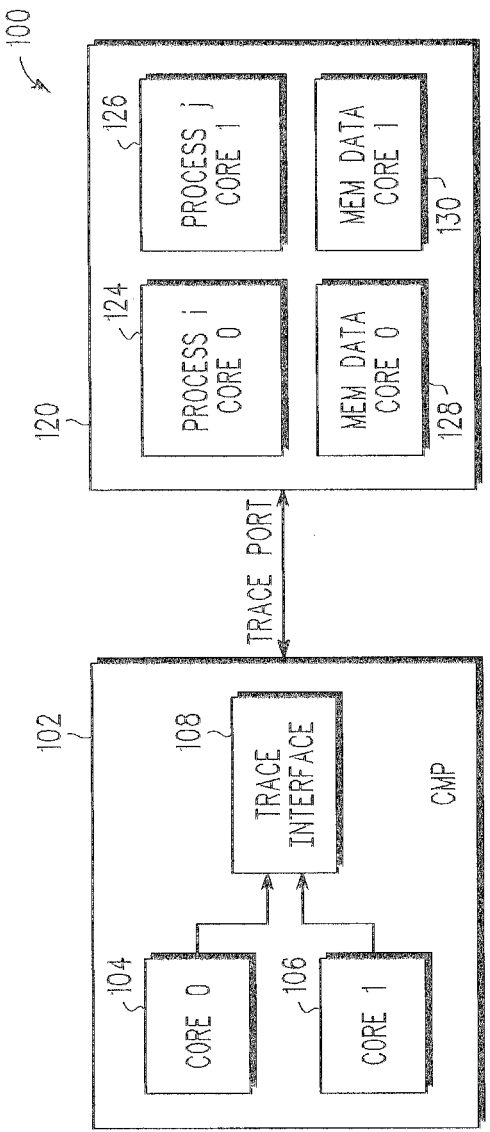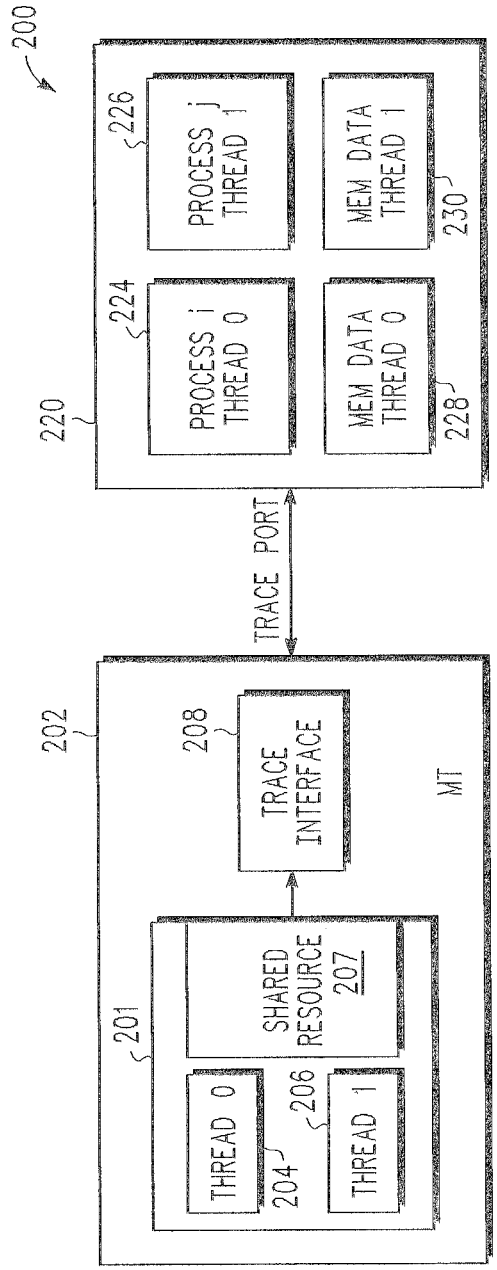

| MINIMUM PACKET SIZE (BITS) | PACKET NAME | PACKET TYPE | PACKET DESCRIPTION |
|---|---|---|---|
| 0 | TSTAMP | VENDOR-VARIABLE | NUMBER OF CYCLES MESSAGE WAS HELD IN THE BUFFER OR THE FULL TIMESTAMP VALUE. FOR TARGETS THAT DO NOT IMPLEMENT TIMESTAMPING, THIS FIELD MAY BE OMITTED. |
| 1 | DATA | VARIABLE | DATA OF THE IN CIRCUIT TRACE. |
| 0 | RSC_NUM | VENDOR-FIXED | IN CIRCUIT RESOURCE NUMBER. IN CIRCUIT RESOURCE CAN BE CORE REGISTERS, GATHERED KEY DEBUG SIGNALS AND PERFORMANCE EVENTS. |
| 0 | SRC | VENDOR-FIXED | CLIENT THAT IS SOURCE OF MESSAGE. FOR TARGETS THAT SUPPORT MULTITHREADING, EACH HARDWARE THREAD IS A VIRTUAL SOURCE OF THE MESSAGE. |
| 6 | TCODE | FIXED | TCODE NUMBER = 34 |

*FIG. 5*

| MINIMUM PACKET SIZE (BITS) | PACKET NAME | PACKET TYPE | PACKET DESCRIPTION |
|---|---|---|---|
| 0 | TSTAMP | VENDOR-VARIABLE | NUMBER OF CYCLES MESSAGE WAS HELD IN THE BUFFER OR THE FULL TIMESTAMP VALUE. FOR TARGETS THAT DO NOT IMPLEMENT TIMESTAMPING, THIS FIELD MAY BE OMITTED. |
| 1 | PROCESS | VARIABLE | TASK/PROCESS ID |
| 0 | SRC | VENDOR-FIXED | CLIENT THAT IS SOURCE OF MESSAGE. FOR TARGETS THAT SUPPORT MULTITHREADING, EACH HARDWARE THREAD IS A VIRTUAL SOURCE OF THE MESSAGE. |
| 6 | TCODE | FIXED | TCODE NUMBER = 2 |

*FIG. 6*

| MINIMUM PACKET SIZE (BITS) | PACKET NAME | PACKET TYPE | PACKET DESCRIPTION |
|---|---|---|---|
| 0 | TSTAMP | VENDOR-VARIABLE | NUMBER OF CYCLES MESSAGE WAS HELD IN THE BUFFER OR THE FULL TIMESTAMP VALUE. FOR TARGETS THAT DO NOT IMPLEMENT TIMESTAMPING, THIS FIELD MAY BE OMITTED. |
| 1 | HIST | VARIABLE | BRANCH/PREDICATE INSTRUCTION HISTORY. THIS PACKET IS TERMINATED BY A STOP BIT SET TO 1 AFTER THE LAST HISTORY BIT. THIS ENDING ALLOWS THE TOOLS TO DETERMINE WHICH BITS ARE PART OF THE HISTORY FIELD AND WHICH ARE PADDED ZEROS. |
| 1 | U-ADDR | VARIABLE | THE UNIQUE PORTION OF THE BRANCH TARGET ADDRESS, EXCEPTION VECTOR ADDRESS OR ADDRESS OF THE NEWLY ACTIVATED THREAD FOR A TAKEN INDIRECT BRANCH OR EXCEPTION. |
| 1 | I-CNT | VARIABLE | NUMBER OF INSTRUCTION UNITS EXECUTED SINCE THE LAST TAKEN BRANCH, EXCEPTION OR THREAD SWITCH EVENT. |
| 0 | B-TYPE | VENDOR-FIXED | BRANCH TYPE. FOR TARGETS THAT SUPPORT MULTITHREADING, THREAD SWITCH EVENT IS A DISTINCTIVE BRANCH TYPE. |
| 0 | SRC | VENDOR-FIXED | CLIENT THAT IS SOURCE OF MESSAGE. FOR TARGETS THAT SUPPORT MULTITHREADING, EACH HARDWARE THREAD IS A VIRTUAL SOURCE OF THE MESSAGE. |
| 6 | TCODE | FIXED | TCODE NUMBER = 28 |

*FIG. 7*

| MINIMUM PACKET SIZE (BITS) | PACKET NAME | PACKET TYPE | PACKET DESCRIPTION |
|---|---|---|---|
| 0 | TSTAMP | VENDOR-VARIABLE | NUMBER OF CYCLES MESSAGE WAS HELD IN THE BUFFER OR THE FULL TIMESTAMP VALUE. FOR TARGETS THAT DO NOT IMPLEMENT TIMESTAMPING, THIS FIELD MAY BE OMITTED. |
| 1 | HIST | VARIABLE | BRANCH/PREDICATE INSTRUCTION HISTORY. THIS PACKET IS TERMINATED BY A STOP BIT SET TO 1 AFTER THE LAST HISTORY BIT. THIS ENDING ALLOWS THE TOOLS TO DETERMINE WHICH BITS ARE PART OF THE HISTORY FIELD AND WHICH ARE PADDED ZEROS. |
| 1 | F-ADDR | VARIABLE | THE FULL TARGET ADDRESS FOR A TAKEN INDIRECT BRANCH OR EXCEPTION OR ACTIVE THREAD. |
| 1 | I-CNT | VARIABLE | NUMBER OF INSTRUCTION UNITS EXECUTED SINCE THE LAST TAKEN BRANCH, EXCEPTION OR THREAD SWITCH EVENT. |
| 0 | CANCEL | VENDOR-VARIABLE | NUMBER OF PREVIOUS PROGRAM TRACE MESSAGES THAT SHOULD BE IGNORED BY THE TOOL. |
| 0 | B-TYPE | VENDOR-FIXED | BRANCH TYPE. FOR TARGETS THAT SUPPORT MULTITHREADING, THREAD SWITCH EVENT IS A DISTINCTIVE BRANCH TYPE. |
| 0 | DCONT | VENDOR-FIXED | INDICATES WHETHER SYNCHRONIZATION IS A RESULT OF A DISCONTINUITY IN THE PROGRAM FLOW RELATIVE TO THE PRIOR PROGRAM TRACE MESSAGE. THIS FIELD CAN BE USED TO DETERMINE WHETHER THE ICNT FIELD IS VALID FOR A GIVEN SOURCE SYNCHRONIZATION. |
| 0 | SRC | VENDOR-FIXED | CLIENT THAT IS SOURCE OF MESSAGE. FOR TARGETS THAT SUPPORT MULTITHREADING, EACH HARDWARE THREAD IS A VIRTUAL SOURCE OF THE MESSAGE. |
| 6 | TCODE | FIXED | TCODE NUMBER = 29 |

*FIG. 8*

| MINIMUM PACKET SIZE (BITS) | PACKET NAME | PACKET TYPE | PACKET DESCRIPTION |
|---|---|---|---|
| 0 | TSTAMP | VENDOR-VARIABLE | NUMBER OF CYCLES MESSAGE WAS HELD IN THE BUFFER OR THE FULL TIMESTAMP VALUE. FOR TARGETS THAT DO NOT IMPLEMENT TIMESTAMPING, THIS FIELD MAY BE OMITTED. |
| 0 | CDATA | VENDOR-VARIABLE | THIS FIELD CAN REPRESENT A VALUE USED IN CORRELATING AN EVENT WITH THE PROGRAM FLOW. |
| 1 | ICNT | VARIABLE | NUMBER OF INSTRUCTION UNITS EXECUTED SINCE THE LAST TAKEN BRANCH. |
| 0 | EVCODE | VENDOR-FIXED | EVENT CODE. REFER TO FIG. 10. |
| 0 | SRC | VENDOR-FIXED | CLIENT THAT IS SOURCE OF MESSAGE. FOR TARGETS THAT SUPPORT MULTITHREADING, EACH HARDWARE THREAD IS A VIRTUAL SOURCE OF THE MESSAGE. |
| 6 | TCODE | FIXED | TCODE NUMBER = 33 |

*FIG. 9*

| EVENT CODE (EVCODE) | PACKET DESCRIPTION |
|---|---|
| 0b0000 | ENTRY INTO DEBUG MODE |
| 0b0001 | ENTRY INTO LOW-POWER MODE |
| 0b0010 | DATA TRACE – WRITE |
| 0b0011 | DATA TRACE – READ |
| 0b0100 | PROGRAM TRACE DISABLED |
| 0b0101-0b0111 | RESERVED |
| 0b1001 | IN CIRCUIT TRACE |
| 0b1010 | THREAD SWITCH |
| 0b0111-0b1111 | VENDOR-DEFINED |

*FIG. 10*

TECHNIQUES FOR TRACING PROCESSES IN A MULTI-THREADED PROCESSOR

BACKGROUND

1. Field

This disclosure relates generally to tracing processes, and more specifically, to tracing processes executing in a multi-threaded processor.

2. Related Art

Various processor designers have attempted to increase on-chip parallelism through superscalar techniques, which are directed to increasing instruction level parallelism (ILP), and multi-threading techniques, which are directed to exploiting thread level parallelism (TLP). A superscalar architecture attempts to simultaneously execute more than one instruction by fetching multiple instructions and simultaneously dispatching them to multiple (sometimes identical) functional units of the processor. Superscalar processors differ from multi-core processors in that the functional units in the superscalar processor are not usually entire processors. A typical multi-threading operating system (OS) allows multiple processes and threads of the processes to utilize a processor one at a time, usually providing exclusive ownership of the processor to a particular thread for a time slice. In many cases, a process executing on a processor may stall for a number of cycles while waiting for some external resource (for example, a load from a random access memory (RAM)), thus lowering efficiency of the processor. Simultaneous multi-threading (SMT) allows multiple threads to execute different instructions in the same clock cycle, using functional units that another executing thread or threads left unused. While the number of concurrent threads is determined by a chip designer, practical restrictions on chip complexity have usually limited the number of concurrent threads to two for most SMT implementations.

Interleaved multi-threading or thread switch multi-threading (TMT) interleaves issue of multiple instructions from different threads. TMT can be further divided into fine-granularity TMT and coarse-granularity TMT depending on the frequency of interleaved issues. Fine-granularity TMT issues instructions for different threads after each cycle. Coarse-granularity TMT usually only switches to issue instructions from another thread when the current executing thread causes some long latency event (e.g., a memory page fault). Chip-level multiprocessing (CMP) integrates two or more processors (e.g., superscalar processors) in one chip. In this case, each processor may execute one thread independently in a number of different combinations. For example, when the CMP includes two processors, the processors may be configured as TMT/SMT, TMT/TMT, or SMT/SMT. Symmetric multiprocessing (SMP) is a multi-processor computer architecture where two or more identical processors are connected to a single shared main memory. SMP systems usually allow any processor to work on any task no matter where the data for that task is located in memory. With proper operating system support, SMP systems can move tasks between processors to balance the workload between the processors. In computing, CMP is essentially SMP implemented in a single very large scale integration (VLSI) integrated circuit. Multiple processor cores (multi-core) typically share a common second-level or third-level cache. A goal of a CMP system is to allow greater utilization of thread-level parallelism (TLP), especially for applications that lack sufficient instruction-level parallelism (ILP) to efficiently utilize superscalar processors.

The Nexus 5001 Forum (formerly known as the global embedded processor debug interface standard consortium (GEPDISC)) was formed to develop an embedded debug interface standard (hereinafter, the "Nexus standard") for embedded control applications. The Nexus standard is particularly applicable to the development of automotive powertrains, data communication equipment, computer peripherals, wireless systems, and other control applications. Developers of embedded processors usually need to have access to a basic set of development tool functions in order to accomplish their jobs. In general, development tools should minimally impact operation of a system under development. For run-control, a developer typically needs to query and modify when a processor is halted, showing all locations available in a supervisor map of the processor. Moreover, a developer also usually needs support for breakpoint/watchpoint features in debuggers, either as hardware or software breakpoints depending on the architecture. For logic analysis, a developer usually needs to access instruction trace information. A developer typically needs to be able to interrogate and correlate instruction flow to real-world interactions. A developer also usually needs to retrieve information on how data flows through the system and to understand what system resources are creating and accessing data. Finally, a developer usually needs to assess whether embedded software is meeting a required performance level.

The Nexus standard provides a specification and guidelines for implementing various messages, e.g., program trace messages (such as branch history messages and synchronization messages), data trace messages, and task/process identification messages (such as ownership trace messages), that may be utilized in debugging applications while minimally impacting operation of a system under development. As defined by the Nexus standard, a program trace message is a message that is provided in response to a change of program flow. According to the Nexus standard, a data trace message is a message that provides visibility of a target processor when a memory write/read reference is detected that matches debug logic data trace attributes. The Nexus standard also defines an ownership trace message (OTM) as a message that provides a macroscopic view of a processor that may be used for task flow reconstruction when debugging software that is written in a high-level language. While the Nexus standard provides a relatively good solution for source level software debugging in low-end and mid-level processors, the Nexus standard is not currently applicable to high-end processors with multi-threading capability. That is, the Nexus standard does not provide a technique for differentiating between threads and, as such, cannot be utilized to debug processors employing multi-threading architectures.

What is needed are techniques for extending the Nexus standard to processors with multi-threading capability.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 is an electrical block diagram of a chip multi-processor (CMP) that includes two cores and a trace (debug) interface that is coupled to a debug tool.

FIG. 2 is an electrical block diagram of a multi-threaded (MT) processor that includes a single core and a trace (debug) interface that is coupled to a debug tool.

FIG. 5 is a table that illustrates an example format for an in-circuit trace message, according to an embodiment of the present disclosure.

FIG. 6 is a table that illustrates an example format for an ownership trace message, according to an embodiment of the present disclosure.

FIG. 7 is a table that illustrates an example format for an indirect branch history with thread switch message, according to an embodiment of the present disclosure.

FIG. 8 is a table that illustrates an example format for an indirect branch history with synchronization message, according to an embodiment of the present disclosure.

FIG. 9 is a table that illustrates an example format for a program correlation trace message, according to an embodiment of the present disclosure.

FIG. 10 is a table that illustrates example event codes for the program correlation trace message of FIG. 9, according to an embodiment of the present disclosure.

DETAILED DESCRIPTION

Figure 3:
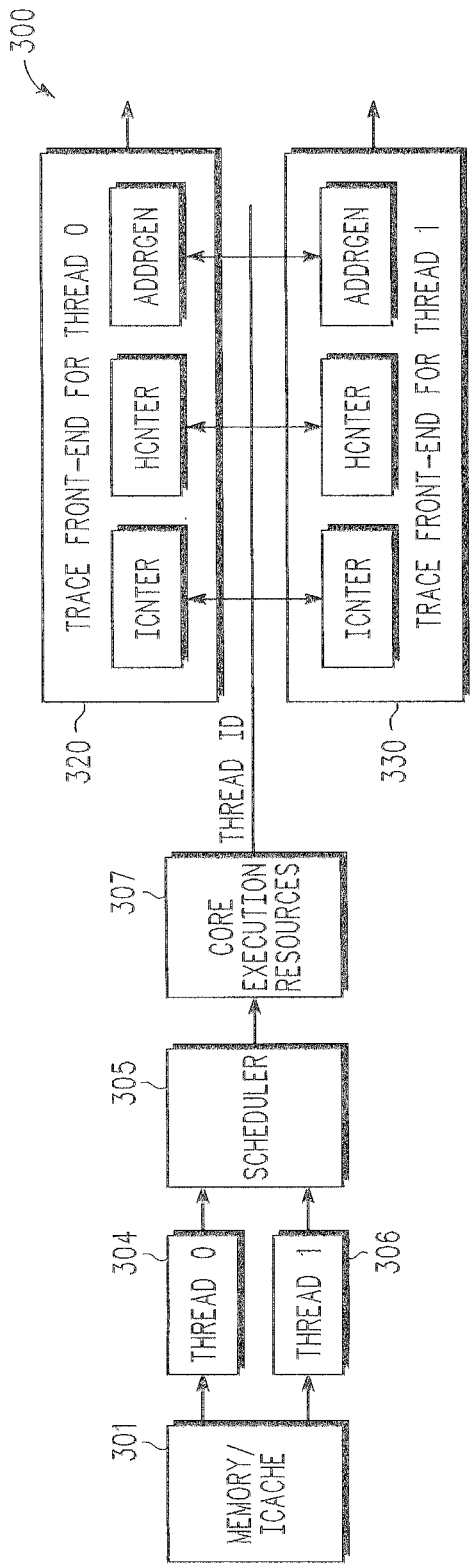
FIG. 3 is an electrical block diagram of a simultaneous multi-threaded (SMT) processor that implements a trace interface with a separate trace front-end for each thread.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, the various processors disclosed herein may be employed in a variety of electronic devices, e.g., personal digital assistants (PDAs), digital cameras, portable storage devices, audio players, computers, wireless mobile communication devices, and portable gaming devices, for example.

According to one aspect of the present disclosure, a technique for tracing processes executing in a multi-threaded processor includes forming a trace message that includes a virtual core identification (VCID) that identifies an associated thread. The trace message, including the VCID, is then transmitted to a debug tool. According to another aspect of the present disclosure, a processor subsystem includes a multi-threaded processor and a debug interface. The debug interface is coupled to the multi-threaded processor and is configured to form a trace message that includes a virtual core identification (VCID) that identifies an associated thread. According to another embodiment of the present disclosure, a system includes a multi-threaded processor, a debug interface, and a debug tool. In this embodiment, the multi-threaded processor is a simultaneous multi-threading (SMT) processor or a thread switch multi-threading (TMT) processor. The debug interface is coupled to the multi-threaded processor and is configured to form a trace message that includes a virtual core identification (VCID) that identifies an associated thread. The debug tool is coupled to the debug interface and is configured to receive and interpret the trace message. As is used herein, the term "coupled" includes both direct electrical connection between elements and indirect electrical connection between elements that is achieved with one or more intervening elements.

According to various aspects of the present disclosure, a technique for extending the Nexus standard to multi-threading processor architectures is disclosed. According to various embodiments, real-time trace capability for multi-threaded processor architectures may be achieved in a relatively cost-effective manner with relatively low-overhead. For example, various messages disclosed in the Nexus standard are adapted to provide real-time information to correctly identify a thread associated with a trace, e.g., a program trace and a data trace. It should, however, be appreciated that various disclosed techniques are equally applicable to applications that are non-real-time. In general, multi-threaded processor architectures can be classified as simultaneous multi-threading (SMT) or thread switch multi-threading (TMT). A fine-granularity TMT processor is similar to an SMT processor, with the exception that issue slots of a given TMT processor cycle can only be occupied by instructions from the same thread. As noted above, in coarse-granularity TMT processors, a thread switch is typically triggered by a long-latency processing event.

During development, a debug (development) tool (executing debug software) may be used to reconstruct program flows and retrieve memory data references based on trace information (e.g., real-time trace information) received from a target device (e.g., a processor). According to one or more embodiments of the present disclosure, debug software is configured to support multi-tasking source level debugging by allocating individual source windows for each process and identifying memory data accesses for each process. In many processor architectures, different processes utilize a processor during a time slice assigned to the different processes by an associated operating system (OS). A context switch is then associated with each transition between time slices during program flow. Different source windows (data entries) are sufficient for source level debugging, as long as a target device provides enough information to identity a process to which a source window (data entry) belongs.

For chip multi-processor (CMP), individual processes can be assigned to each processor core by a simultaneous multi-processor (SMP) capable operating system (OS). As such, more than one process (one for each core) can be executed simultaneously. In order to clearly distinguish between processes, a core identification (CID) may be included within each trace message transmitted from a target device. This allows debug software to correlate traces, e.g., a program trace with a data trace, and provides observability as to which process owns a data entry during program flow. In processors with multi-threading capability, core execution resources are provided for processing more than one instruction stream. In general, with a few exceptions, the software system infrastructure needed to support multi-processor debugging is similar to multi-core multi-process debugging. For example, an individual thread may be distinguished by treating each hardware thread as a virtual core. In this case, each trace message associated with a given virtual core (hardware thread) is also tagged with a virtual core identification (VCID). From the perspective of a debug tool, different processor cores and threads may be categorized as hardware execution resources. In any case, a debug tool is only required to properly identify and trace instruction execution and data references of different processes. According to various aspects of the present disclosure, a CID and a VCID (trace ID) may be incorporated within a trace message to correctly identify associated processes in a trace stream.

Traditionally, trace ownership could be readily determined based on a unique process identification (PID) associated with each process. For example, with reference to FIG. 1, a system 100 is illustrated that includes a chip multi-processor (CMP) 102 that includes multiple cores 104 and 106, which are in communication with a trace interface 108. The trace interface 108 provides trace information to a debug tool 120 via a trace port. The debug tool 120 uses a PID, associated with program trace information, to reconstruct program flow of a process 124 that executes on core 104 and a process 126 that executes on core 106. The debug tool 120 also uses data trace information 128 and 130 to retrieve data memory references for the cores 104 and 106, respectively. In contrast, with reference to FIG. 2, a system 200 that includes a multi-threaded (MT) processor 202 that executes multiple threads 204 and 206, which are in communication with a trace interface 208 through a shared resource 207, needs to be able to differentiate between threads in order to properly reconstruct program flow and retrieve data memory references. In this case, the trace interface 208 may be configured to provide trace information to a debug tool 220 that includes a trace identification, or virtual core identification (VCID). The debug tool 220 uses program trace information, including the VCID, to reconstruct program flow of a process 224 that executes thread 204 and a process 226 that executes thread 206. The debug tool 220 also uses data trace information 228 and 230 to retrieve data memory references for the threads 204 and 206, respectively.

In multi-threaded architectures, each single-thread uniprocessor or hardware thread of a multi-threaded uniprocessor may have more than one address space (AS) indicator, including a main AS indicator for a current process and one or more other AS indicators for other processes sharing a data entry with the current process. Moreover, as used herein, the term "AS indicator" may be used to encompass both instruction and data space indicators. With reference to FIG. 3, a relevant portion of an SMT processor 300 is illustrated. The SMT processor 300 includes multiple threads 304 and 306 that receive instructions from a memory/instruction cache (ICache) 301. A scheduler 305 schedules the threads 304 and 306 for execution on core execution resources 307. As the SMT processor 300 includes threads that are executing in parallel, different trace front-ends 320 and 330 are implemented for the threads 304 and 306, respectively. To trace instructions, the trace front-ends 320 and 330 each usually implement an instruction counter (Icnter), a history counter (Hcnter), and an address generator (Addrgen), the application of which is described further below. According to an embodiment of the present disclosure, a debug tool may maintain a list of AS indicators tagged with associated VCIDs to indicate ownership of a trace. In this case, each process source window has an associated AS indicator. According to various embodiments of the present disclosure, whenever trace information is received from a target device (processor), the debug tool decodes the VCID and associates the VCID with a PID/AS indicator using a look-up table, as the AS indicator and the PID are both part of the address space.

Basically, in one embodiment, the debug tool maintains a look-up table of resident process PID/AS indicators (in the format of VCID versus PID/AS indicator). A process is resident when it is loaded into one of the hardware threads of the processor through a context switch, irrespective of whether the thread is active or dormant. When an OTM message is received, the table is updated with a new PID/AS indicator for the corresponding thread identified by VCID. When another type of trace message is received, an associated VCID is then located in the look-up table and an associated PID/AS indicator field provides an associated PID/AS indicator. The debug tool can then use the PID to identify the proper source window. Using the AS indicator, the debug tool may then correlate the instruction trace information with a source window of an associated process. As each entry of memory (or cache access) may be shared by multiple processes, a debug tool may track the AS indicators associated with each data entry in order to validate a data access of an arbitrary process.

Figure 4:
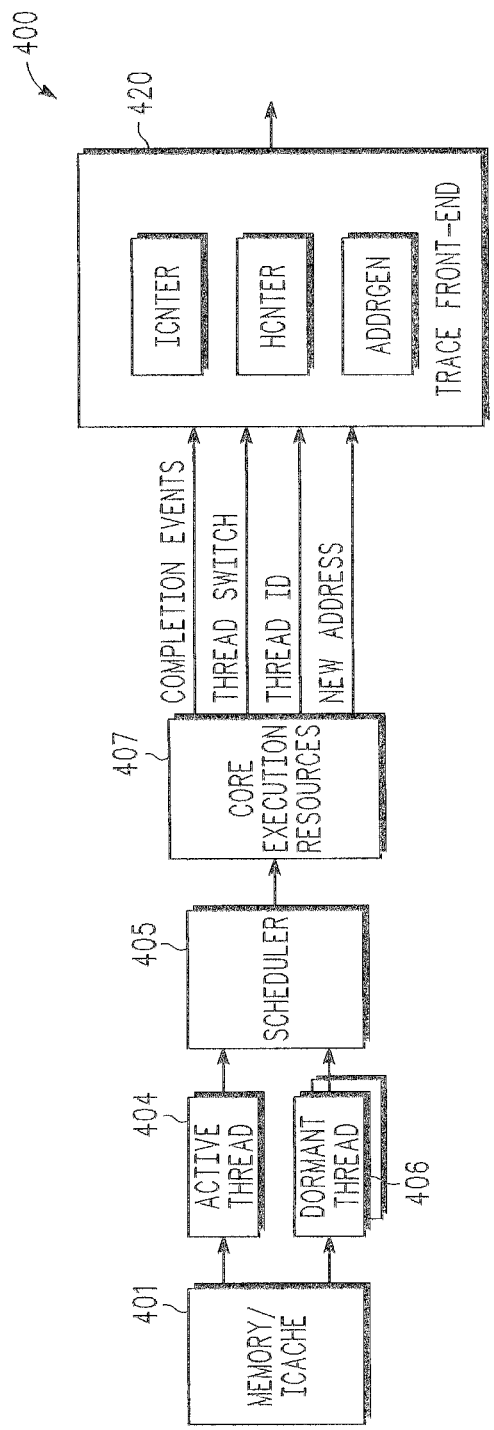
FIG. 4 is an electrical block diagram of a thread switch multi-threaded (TMT) processor that implements a trace interface with a common trace front-end for all threads.

With reference to FIG. 4, a relevant portion of a TMT processor 400 is depicted. The TMT processor 400 includes at least one active thread 404 and usually multiple (two are shown in FIG. 4) dormant threads 406 that receive instructions from a memory/instruction cache (Icache) 401. A scheduler 405 schedules the threads 404 and 406 for execution on core execution resources 407. As the TMT processor 400 only executes one thread at a time, a single trace front-end 420 is implemented for the threads 404 and 406, respectively. In general, the trace front-end 420 implements an instruction counter (Icnter), a history counter (Hcnter), and an address generator (Addrgen). As noted above, the Nexus standard defines various program trace messages that provide program flow visibility. According to the Nexus standard, branch trace messaging includes traditional and history messages. According to an embodiment of the disclosure, a branch history message (BHM) is adapted for multi-threaded processors. A traditional branch trace message (BTM) facilitates program trace by providing visibility whenever a change of program flow occurs. The change of program flow may be caused by, for example, a direct branch or subroutine call, a return instruction, an asynchronous interrupt/trap, or indirect branch instruction. A traditional BTM has provided an instruction count (I-CNT) that corresponds to the number of sequential instruction units that were executed since a last taken branch or exception. As is well known, an exception is an occurrence of some condition that changes the normal flow of execution. In general, when an exception occurs, a current processor state is saved in a predefined location and execution switches to a predefined exception handler. Depending on the situation, the handler may later resume execution at the original location, using the saved information to restore the original state.

An historical BTM or BHM facilitates program trace by providing visibility whenever a change of program flow occurs. The change of program flow may also be caused by, for example, a direct branch or subroutine call, a return instruction, an asynchronous interrupt/trap or indirect branch instruction. In addition to providing an instruction count (I-CNT), the BHM has also provided a branch/predicate instruction history (HIST) field, wherein a value of '1' indicates taken and a value of '0' indicates not taken. As is well known, a predicate instruction may be executed if its predicate is true and discarded if the predicate is false. Alternatively, depending on the processor architecture, a predicate instruction may be executed irrespective of whether its predicate is true and committed to architectural state or discarded based on whether the predicate is true or false.

In order to support SMT or fine granularity TMT processing, a different program trace front-end may be implemented for each thread. It should be appreciated that in an architecture that implements a high-performance processor that supports multiple instruction retirement in a single cycle, completion events for the single cycle may belong to different threads. To properly track thread ownership, completion events may be decoded and associated with a thread ID before being sent to a program trace front-end (i.e., a program trace front-end associated with the thread ID) for trace compression and trace generation. The program traces may then be sent to a shared Nexus back-end for packetization with a VCID associated with the thread. The VCID (thread ID) may be included in a source (SRC) field of each program trace message. In a multi-core design with one or more of the cores having multi-threading capability, the source (SRC) field may include a concatenation of the CID and the VCID. In the case where a given core is not multi-thread capable, the VCID may default to zero.

It should be appreciated that a given thread may communicate with another thread within a give core. That is, direct inter-thread communication or data sharing enabled by core registers may take place within a given core of a multi-core architecture. In this case, it is desirable to provide a technique that readily allows a debug tool to decipher trace information and correlate program flow and data between threads. As threads may be embedded within core boundaries, proper tracing of program flow may require tracking of inter-thread communication or shared memory access that employs semaphores. As is known, a semaphore is a protected variable (or abstract data type) that may be used to restrict access to shared resources (e.g. storage) in a multi-programming environment. In a typical application, a value of a semaphore is initialized to the number of equivalent shared resources it is implemented to control. In general, semaphores may be thought of as a primitive synchronization mechanism for an operating system (OS). For example, semaphores may be used to coordinate between multiple threads that work together to complete a task.

In a coarse-granularity TMT processor (see FIG. 4), multiple threads may alternately occupy core execution resources. In a typical coarse-granularity TMT processor, the time slice is directly managed by hardware, as contrasted with operating system (OS) thread management. A thread switch may be triggered by, for example, a long latency processing event (e.g., an L2 cache miss) associated with an active thread. For example, a processor may include a single core that supports one active thread and two dormant threads. In general, the thread switch architecture, while having less peak instruction throughput than SMT, is a cost effective multi-threading approach. Moreover, coarse-granularity TMT processors are usually more manageable and more observable from the perspective of a debug tool. For example, in TMT processors that only support one active thread, the program flow is not mixed between threads at any given cycle when instructions retire from the completion logic. Thus, the time slice operation of coarse-granularity TMT processors allows for use of a single trace front-end for multiple threads. The signals from the processor cores may consist of various completion events, thread switch events, active thread ID, and new target address of program flow changes. The various signals are handled by a single program trace front-end. During a thread switch, a special message (e.g., a branch trace message (BTM)) may be generated to indicate a program flow change with the old VCID for the old thread going dormant and a target address for the new thread going active. A program trace message may then be sent to a trace interface back-end for packetization with the VCID associated with the thread. As noted above, the VCID is included in the source (SRC) field of each program trace message. In a multi-core design, with one or more multi-threading capable processors, the source (SRC) field may be formed of a concatenation of the CID and VCID.

As noted above, a thread switch may be used as a triggering event for a BTM. In this way, a thread switch may be reported to an external debug tool. As one example, a branch history message (BHM), configured according to an embodiment of the disclosure, may be used to report a thread switch (see FIG. 7). At a thread switch, the BHM may provide an instruction count that corresponds to the instruction units executed since a last taken branch, exception, or thread switch event and a history that contains a history of taken and non-taken direct branches since a last BHM. A branch type (B-TYPE) field may be enhanced to differentiate a thread event from a branch or exception. An address field (U-ADDR), including a unique address portion, may be employed to report a target address of a newly activated thread. As noted above, the source (SRC) field may be modified to report the CID and the VCID of the thread going dormant. The advantage of this approach is its simplicity and relatively low bandwidth overhead near a thread switch event.

According to another aspect of the present disclosure, an in-circuit trace (ICT) message (see FIG. 5) may be employed to report inter-thread communication or shared memory access. More broadly, an ICT message may be used to report any circuit event, e.g., core register access, key circuit debug signals, watchpoint events, and performance events, in real-time. Moreover, various hardware signals may be grouped into a data portion of an ICT message. In general, design of an ICT message should be highly programmable and easily configurable to trace various hardware events for different debug purposes. An ICT message can be used to, for example, monitor inter-thread communication in a SMT processor, or correlate watchpoint or performance events to a program trace of an associated thread. In general, an ICT message should be designed to include a source (SRC) field which may include a CID and a VCID which allows a debug tool to determine what thread is associated with the ICT message.

As noted above, a data trace message provides visibility of a target processor when a memory write/read reference is detected that matches debug logic data trace attributes. The data trace message includes an effective address of the memory access and its associated data. For a processor with a memory management unit (MMU), address comparison in the MMU usually takes place before a speculative memory address is resolved. In this case, in order to obtain a correct effective address, the effective address has to be stored with the real address before the real address is retrieved by a pipeline or stored in a level 1 (L1) cache. To reduce cost, a tighter address range filter may be employed. However, employing a tighter address range filter usually reduces visibility. As discussed above, to support a multi-threaded processor core, a VCID may be included in a source (SRC) field of each data trace message to identify a thread associated with a memory write/read access.

As noted above, an ownership trace message (OTM) provides a macroscopic view of a processor that may be used for task flow reconstruction when software written in a high-level language is being debugged. The OTM is especially useful when employed with embedded processors having memory management units (MMUs). In this case, all processes may use the same logical program and data spaces. The Nexus standard defines the OTM as a message that is used to track process ID (PID) changes. As previously noted, to enable data sharing among different processes, more than one PID or address space (AS) indicator may be allocated for each thread. According to various aspects of the present disclosure, in order to distinguish which hardware thread is associated with a current PID, a VCID (thread ID) is include in a source (SRC) field of an OTM (see FIG. 6). The OTM is sent to a development tool periodically or when a PID register changes. When the OTM is periodically sent, the OTM may include all PIDs defined for a current thread. When the OTM is sent when a PID register changes, the OTM may only include the PID register that changed to reduce bandwidth requirements. To support either scenario, a variable length process field may be implemented in the OTM. The process field may include a PID enumeration (PID_ENUM) section followed by a fixed length PID section. If a PID_ENUM bit of an associated PID is set, then the PID is included in the packet. If the PID_ENUM bit is not set, then the PID is not included in the packet. In one embodiment, a four bit PID_ENUM section is provided to support up to four 16-bit PIDs.

Another way to report a thread switch is with the combination of a program correlation trace (PCT) message and an indirect branch history with synchronization message (see FIGS. 8-10). The PCT message includes an event code (EVCODE) field that may be modified to indicate additional events. For example, a thread switch may be indicated by reporting an event code of '0b1010'. An indirect branch history with synchronization message format may also be modified in a similar manner. An advantage of this approach is that the I-CNT/HIST fields of the thread going dormant are included in a PCT message and optionally the full target address (F-ADDR) field of the thread going active is included in a separate BTM responsive to the thread switch. However, sending both a PCT message and a BTM to indicate a thread switch increases bandwidth overhead. In contrast, using a PCT alone to indicate a tread switch, while reducing bandwidth overhead, increases reconstruction complexity.

Figure 11:
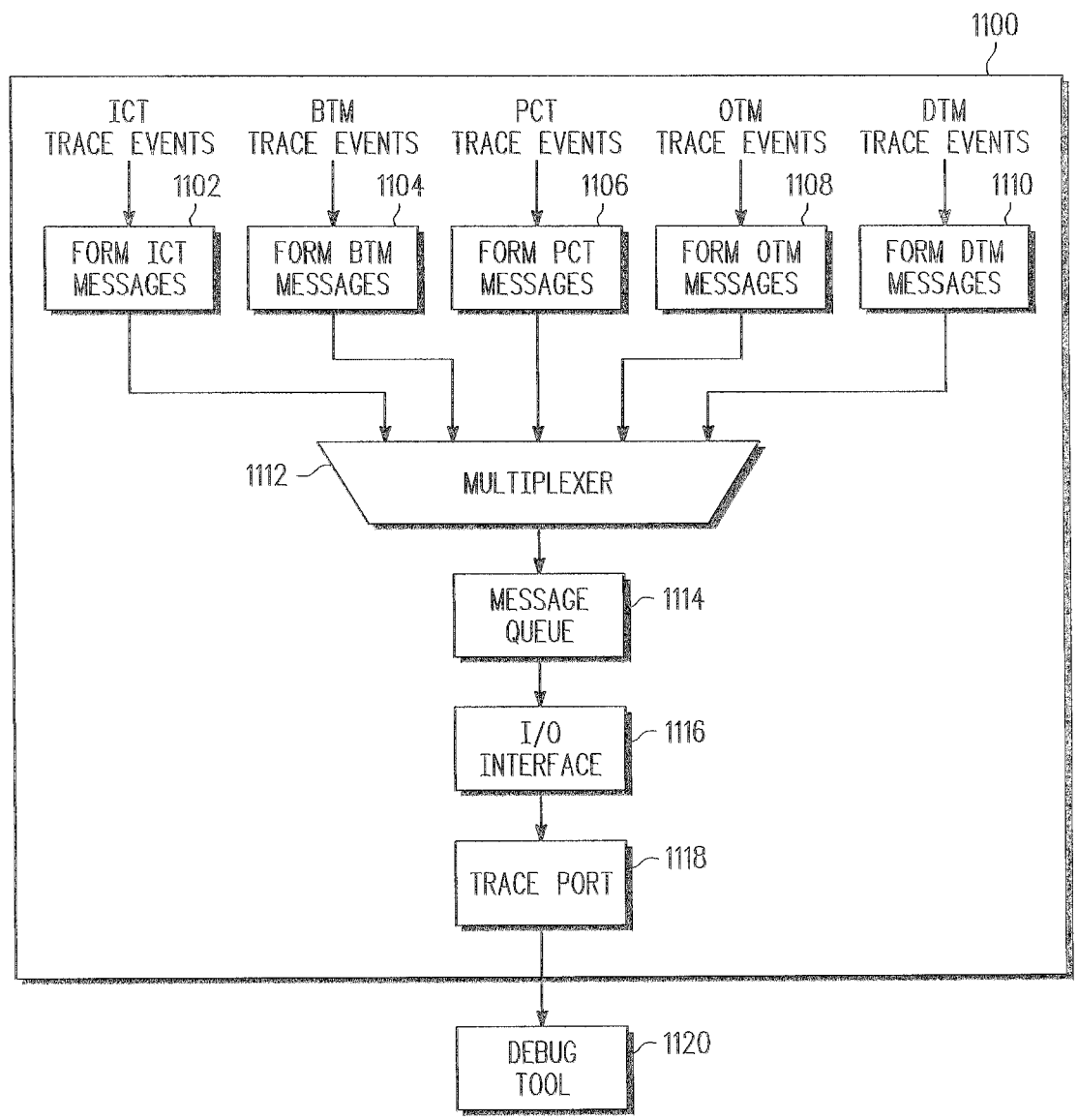
FIG. 11 is a block diagram of a debug interface for tracing processes, according to an embodiment of the present disclosure.

With reference to FIG. 11, a relevant portion of a debug interface 1100 for tracing processes, according to an embodiment of the present disclosure, is illustrated. As is depicted, multiple trace streams may be processed in parallel by the interface 1100, which forms trace messages responsive to trace events. One or more trace message inputs of multiplexer 1112 may be selected to provide messages at one or more outputs of the multiplexer 1112. In a typical situation, each of the trace events provides an associated thread identification (ID) and a core ID (if applicable) to an appropriate message forming block. As noted above, the thread and core ID may be concatenated in a single source (SRC) field of a message. When an in-circuit trace (ICT) event occurs, an ICT message forming block 1102 forms an ICT message, which is provided to an associated one of the inputs of the multiplexer 1112. The ICT message may be formed responsive to an inter-thread communication or a shared memory access. A circuit event that corresponds to, for example, a core register access, a key circuit debug signal, a watchpoint event, or a performance event may be reported in the ICT message. When a branch trace message (BTM) event occurs, a BTM forming block 1104 forms a BTM, which is provided to an associated one of the inputs of the multiplexer 1112. The BTM may be a branch history message (BHM) that identifies a thread switch in a branch type (B-TYPE) field.

When a program correlation trace (PCT) event occurs, a PCT message forming block 1106 forms a PCT message, which is provided to an associated one of the inputs of the multiplexer 1112. An event code (EVCODE) field of the PCT message may identify a thread switch. The PCT message allows debug tool 1120 to, for example, correlate watchpoint or performance events to a program trace of an associated thread. When an ownership trace message (OTM) event occurs, an OTM forming block 1108 forms an OTM, which is provided to an associated one of the inputs of the multiplexer 1112. The OTM may be periodically formed or formed in response to a processor identification (PID) register change. Similarly, when a data trace message (DTM) event occurs, a DTM forming block 1110 forms a DTM, which is provided to an associated one of the inputs of the multiplexer 1112. Messages provided at the one or more outputs of the multiplexer 1112 are provided to a message queue 1114, which determines whether the messages are to be transmitted in real-time or stored for later transmission. Messages that are to be transmitted to the debug tool 1120 are provided to an input/output interface 1116, which transfers the messages to a trace port 1118, which is coupled to the debug tool 1120.

Accordingly, a number of techniques have been disclosed herein that provide information that readily allows a debug tool to correctly trace one or more processes executing on a multi-threaded processor.

As used herein, a software system can include one or more objects, agents, threads, subroutines, separate software applications, one or more lines of code or other suitable software structures operating in one or more separate software applications, on one or more different processors, or other suitable software architectures.

As will be appreciated, the disclosed processes may be implemented using any combination of computer programming software, firmware or hardware. As a preparatory step to practicing the invention in software, the computer programming code (whether software or firmware) will typically be stored in one or more machine readable storage mediums such as fixed (hard) drives, diskettes, optical disks, magnetic tape, semiconductor memories such as read-only memories (ROMs), programmable read-only memories (PROMs), etc., thereby making an article of manufacture.

Although the invention is described herein with reference to specific embodiments, various modifications and changes can be made without departing from the scope of the present invention as set forth in the claims below. For example, other messages that report a thread identification may be employed. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   forming, responsive to an inter-thread communication or a shared memory access, a trace message that is an in-circuit trace message, the trace message including a virtual core identification (VCID) that identifies an associated first thread of a process executing in a multi-threaded processor and a core identification that identifies a first processor core associated with the first thread; and
   transmitting the trace message to a debug tool.

2. The method of claim 1, wherein the forming further comprises:
   forming the trace message in real-time.

3. The method of claim 1, further comprising:
   reporting, in the in-circuit trace (ICT) message, a circuit event corresponding to a core register access, a key circuit debug signal, a watchpoint event, or a performance event.

4. The method of claim 1, further comprising:
   concatenating the core identification with the virtual core identification (VCID) in a single field of the trace message.

5. A processor subsystem, comprising:
a multi-threaded processor comprising a first processor core and a second processor core; and
a debug interface coupled to the multi-threaded processor, wherein the debug interface is configured to form a trace message that is an in-circuit trace (ICT) message that is formed in response to an inter-thread communication or a shared memory access, and that includes a virtual core identification (VCID) that identifies an associated thread and a core identification that indicates one of the first processor core and the second processor core associated with the thread.

6. A multi-threaded processor comprising:
a first processor core and a second processor core, wherein the multi-threaded processor is a simultaneous multi-threading (SMT) processor or a thread switch multi-threading (TMT) processor;
a debug interface coupled to the multi-threaded processor, wherein the debug interface is configured to form a trace message that is an in-circuit trace message that is formed in response to an inter-thread communication or a shared memory access, and that includes a virtual core identification (VCID) that identifies an associated thread and a core identifier that indicates one of the first processor core and the second processor core associated with the thread; and
a debug tool coupled to the debug interface, wherein the debug tool is configured to receive and interpret the trace message.

7. The system of claim 6, wherein the multi-threaded processor is a fine-granularity thread switch multi-threading (TMT) processor or a coarse-granularity thread switch multi-threading (TMT) processor.

* * * * *